United States Patent [19]

Howard

[11] Patent Number: 5,394,955
[45] Date of Patent: Mar. 7, 1995

[54] APPARATUS FOR ENCOURAGING SEAT BELT USE

[76] Inventor: Warren Howard, 9340 Halsell St., Gulfport, Miss. 39501

[21] Appl. No.: 821,836

[22] Filed: Jan. 13, 1992

Related U.S. Application Data

[63] Continuation-in-part of Ser. No. 589,453, Sep. 27, 1990, abandoned.

[51] Int. Cl.$^6$ ............................................. B60K 28/04
[52] U.S. Cl. ................................. 180/273; 280/801.1
[58] Field of Search ................... 280/801, 802, 801.1; 180/269, 270, 273; 340/457.1

[56] References Cited

U.S. PATENT DOCUMENTS

| | | | |
|---|---|---|---|
| 3,808,592 | 4/1974 | Wright | 180/270 |
| 4,136,328 | 1/1979 | Cambern | 180/270 |
| 4,189,170 | 1/1980 | Tanaka | 280/802 |
| 4,673,195 | 6/1987 | Boyd et al. | 340/457.1 |

Primary Examiner—Kenneth R. Rice
Assistant Examiner—Paul N. Dickson
Attorney, Agent, or Firm—Alexander Norcross

[57] ABSTRACT

An apparatus for seat belt use encourages use without inducing extensive user resistance. A seat mounted switch detects occupancy of a seat and activates an inducement circuit; a seat belt latch mounted switch detects the fastening of a seat belt and completes the inducement circuit. The inducement circuit controls power to occupant comfort and convenience features of the automobile, notably radio, audio and heating/cooling systems. The automobile will continue to function if seat belts are not used, but at a generally undesirable loss of comfort and convenience features. Seat belt use occurs as it is less uncomfortable to use the seat belts than to omit use.

5 Claims, 1 Drawing Sheet

U.S. Patent  Mar. 7, 1995  5,394,955
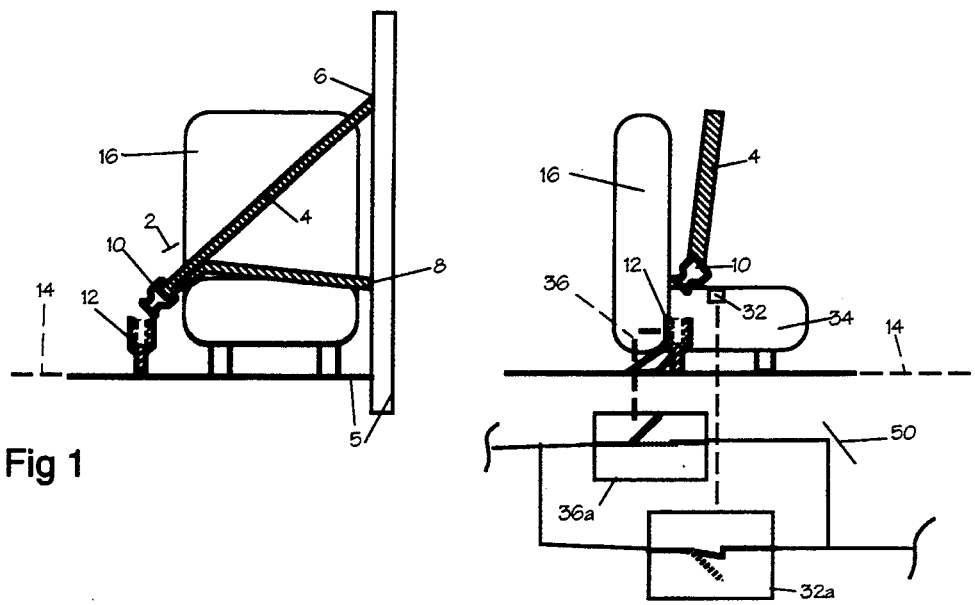
Fig 1
Fig 3
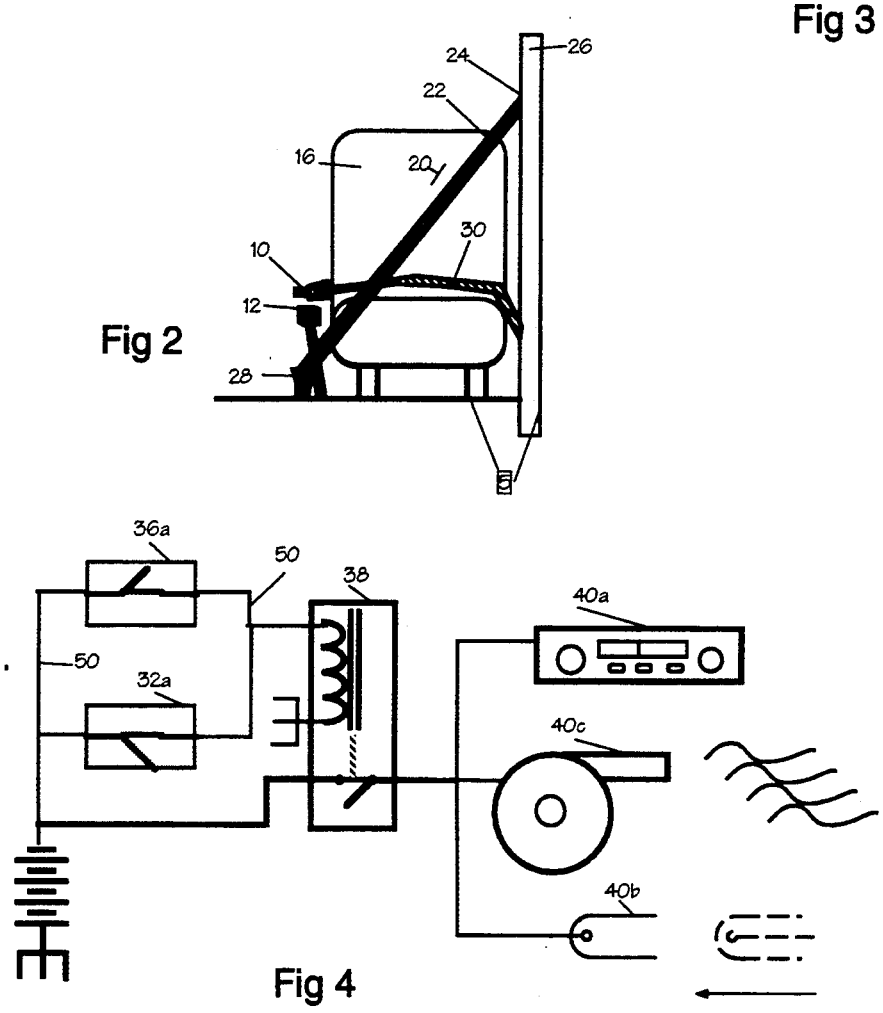
Fig 2
Fig 4

APPARATUS FOR ENCOURAGING SEAT BELT USE

This is a continuation-in-part of application serial number 07/589,453, filed on Sept. 27, 1990, now abandoned.

BACKGROUND OF THE INVENTION

Seat belts are a recognised primary occupant protection feature for automobiles. They have such a significant beneficial impact in reducing the incidence of injuries and death in collisions that their installation has long been mandated as an essential item of safety equipment.

It is equally known that the incidence of use of seat belts falls well below the desirable level of complete use by all vehicle occupants. Initially, coercive schemes for forcing seat belt use were imposed. The most famous such was a short lived federal regulation that mandated interlocking the vehicle engine with a seat belt sensor so that the vehicle could not be started unless all seat belts were fastened. An intense consumer reaction to this regulation led to its cancellation. Coercive schemes still remain, notably in the existence of State Seat Belt usage laws.

Currently, effort in the area of vehicle occupancy restraints centers on passive devices which do not require occupant cooperation for their function. Air bags are the currently ultimate passive restraint. However, Air bags are principally useful for protection against forward collision forces; they provide little protection against side impacts. Further, a significant proportion of crash injuries and deaths occur as a result of second impacts: the vehicle, as a result of the first impact, is projected into a second, usually more severe second impact. Air bags provide protection for only a short time period, often deflating before the second impact, which leaves the occupant unprotected.

Passive seat belt systems, alone or in conjunction with Air bags, are the current mandated occupant restraint solution. These generally take the form of door mounted belts which enclose an occupant as the door is closed. Unfortunately, current designs only automatically fasten the shoulder harness, and a lap belt must be manually fastened. Users often do not fasten the lap belt, and as a result may be severely injured by the shoulder harness alone. Also, automatic belts can still be disconnected completely, and often are.

SUMMARY OF THE INVENTION

This invention pertains to the field of vehicle occupant restraints, particularly to seat belts.

Seat Belt usage by vehicle occupants is a complex function of occupant habits and desires. Most persons explain their non-use of seat belts as being due to inconvenience or discomfort. It is typically observed that persons who use seat belts use them on all occasions, and those who do not always use seat belts tend to use them less and less frequently. These latter non-users react adversely to coercion; they will not, for instance, accept vehicles in which seat belt use is required to operate the vehicle.

The invention here disclosed is a combination improvement to a seat belt installation, usable with manually fastened seat belts or with automatic belts to discourage disconnection, which enhances seat belt use by, essentially, establishing an perception of slightly greater discomfort from non-use than from use. The improvement lies in the interconnection of seat use sensor and seat belt use sensor to control the vehicles secondary, passenger convenience functions, notably the radio or stereo or the heating or air conditioning systems.

In simplest form, the seat belt use sensor interlocks the power to the vehicle's radio and to the heater/air conditioner control. The vehicle remains functional, and the user can start and drive as before; only the level of occupant comfort has been decreased.

It is thus an object of the invention to discourage non-use of seat belts without inducing overt user rejection of the seat belt system.

It is a further object of the invention to increase the use of seat belts.

It is a further object of the invention to inculcate a habit of seat belt usage in vehicle occupants.

It is a further object of the invention to induce increased vehicular seat belt usage without inhibiting essential operational capability of the vehicle.

BRIEF DESCRIPTION OF THE DRAWINGS

FIG. 1 is a view of a one piece manual seat belt.

FIG. 2 is a view of an automatic seat belt, showing the separate, manually latched lap belt.

FIG. 3 is a schematic of the occupancy and seat belt latch sensors.

FIG. 4 is a schematic of the invention.

DETAILED DESCRIPTION OF THE PREFERRED EMBODIMENT

As is known, passive occupant restrains in American vehicles follow two basic designs. The first is a fully manual seat belt-shoulder harness 2 combination in which a continuous belt 4 is fastened to a vehicle structure 5 at two points 6, 8 along one side of a seat 16, one point 6 above average seated shoulder height and one point 8 at floor level 14. Some means is provided to adjust the length of the belt, usually in the form of an inertial locking take up reel (not shown). A seat belt buckle 10 slides along the belt and engages in a mating, latching clasp 12, mounted at floor level 14 on the opposite side of the seat 16.

The second is a door mounted automatic belt 20, in which a shoulder belt 22 is fastened at an upper end 24 to a device moving in a track in the door 26, and at a lower end 28 to the floor structure 14a at a location diagonally across the seat 16 from the door 26. The door track mechanism (not shown) is constructed so that as the door 26 closes, the belt 22 is drawn tight across the body of the user. A separate manual lap belt 30 must still be fastened by the user to provide complete protection.

A previous, ultimately publicly rejected seat belt usage system developed adequate sensors 32, 36, known to the art, for detecting the presence of an occupant in the seat and for detecting the latching of a seat belt buckle into its clasp. The occupant detection sensor 32 usually comprises a pressure sensitive electrical switch 32a mounted in the base 34 of the seat 16, and activated by the displacement of the seat under the weight of a user. The buckle latching sensor 36 also usually comprises an electrical switch 36a, mounted in the clasp 12 and activated by complete locking insertion of the buckle 10. Various forms of such switchs exist, known to the seat belt art, which primarily differ in their mechanical detection of full buckle engagement.

The above sensor mechanisms are understood in the art and the specific variant chosen will be apparent to those workers skilled in the art. It should be apparent, however, that since one aspect of my invention is that it does not create the safety risks of the prior art engine operation interlocks, that the extreme reliability required of the prior art sensors is not required of those sensors in use in my invention, and this may change the engineering selection of specific sensors to be used.

In my invention, I use the sensors 32,36 above described as electrical switches 32a, 36a to detect the presence of one of more vehicle occupants, and for each occupant, the correct latching of the corresponding seat belt 2,20. Seat occupancy sensor switch 32a is normally closed, and is opened by the weight of a seat occupant. Belt latching sensor switch 36a is normally open, and is closed by the latching of the belt. Many variations are possible for this interconnection, all of which are known or will be readily apparent to those familiar with automotive sensors, and the depicted installation is chosen solely to illustrate the functioning of the invention.

Both electrical switches 32a, 36a are preferably connected in parallel, so that the overall sensor circuit 50 for each belt position is closed if the seat is not occupied or, if the seat occupied, only when the belt is fastened; otherwise the circuit is open.

In turn, the sensor electrical circuit 50 controls means 38 for applying power to one or more occupant comfort units 40a,b,c in the vehicle. The phrase Occupant Comfort Units may designate entertainment units 40a, notably an installed radio or stereo; accessory sockets 40b supplied for optional plug in accessories, such as cigarette lighters; or electrically controlled heating or air conditioning apparatus 40c. This list is not exhaustive, as designers now and in the future will expand the accessories provided in a car for the user's enjoyment. The phrase "Occupant Comfort Unit" as used herein, however, excludes any electrical system necessary for the safe operation of the vehicle, and thus lights, signals, the engine and any operating controls are excluded.

In the invention as described, the power to the chosen operator comfort units passes through control means 38, as for example a normally open relay, which is controlled by the sensor circuit 50. Only if the sensors 32,36 are closed by all occupied seats 16 having latched seat belts 2,20 will the relay 38 close, providing power to the occupant comfort units 40. If one or more seats 16 are occupied, but the seat belts 2,20 are not fastened, then the relay 38 will not close, and the occupant comfort units 40 will be rendered inoperative. It is apparent to those skilled in the art that use of a relay for control unit 38 is merely illustrative. Relays remain the most common such control units known to the inventor, but are rapidly being replaced by various solid atate power control devices, which may equally serve for control means 38. It will also be apparent how the invention described may be integrated into an overall vehicle power control system under microprocessor control; the exact implementation of such a control would be so much affected by other unrelated vehicular systems that no prototype can be here described.

As a result of all power to the chosen operator comfort units passing through control means 38, the invention is rendered not susceptible to easy user defeat or disablement. The balanced psychological inducement imposed by making use of the vehicle less comfortable, but not impossible, is sustained by making it easier to fasten the seat belt than to by pass the comfort unit disablement or to restore, by alternate action, operation of the comfort units. For this reason, it is considered best that any accessory power outlets in the vehicle, such as the lighter socket 40b, be controlled by the control means 38 to prevent ready by passing of the invention.

It is a critical part of my invention that this circuit arrangement does not affect operator safety or the ability of the user to start and safely drive the car. Rather, it induces a degree of discomfort or psychological annoyance from the lack of the occupant comfort items which balances, in the mind of the user, the discomfort or psychological resistance to wearing the seat belt. It appears the this inducement, especially by controlling the operation of an installed stereo, will have its most marked effect on young drivers, who are statistically most in need of proper seat belt habits due to their greater frequency of accidents.

Further, this balancing of psychological inducements is below the level of coercive controls, as the invention does not prevent operation of the vehicle. Thus the invention induces in a majority of users a habit of seat belt use on all occasions, without inspiring a strong counter reaction against the invention. It is felt that use of the invention will largely avoid the open and wide spread user attempts to defeat and disconnect the entire mechanism, which defeated the earlier unsuccessful engine interlock.

The invention does not create perfect total use by all users of seat belts, but then the semiautomatic door mounted belts of the current art are often found disconnected and unused. It will however, by providing a balanced psychological inducement less than coercion but greater than the countering discomfort of seat belt use, expand the use of manual seat belts so as to render conventional manual seat belt systems as or more effective than automatic belts.

Manual belt are cheaper, and, having fewer moving parts, more reliable than automatic belts. Since use of a manual belt prevents porpoising of the user in a frontal crash, manual belts where used are safer than automatic belts alone, which do not provide a restraining lap belt. The invention described thus can be seen to both improve safety and reduce costs.

I claim:

1. An apparatus for inducing seat belt usage by occupants of a vehicle comprising:
   means, responsive to occupancy of a vehicle seat by an occupant, for generating a first signal;
   means, responsive to latching of a seat belt by an occupant, for generating a second signal;
   means comprising:
   means responsive to said first and said second signal, for controlling electrical power to accessible vehicle accessory power outlets and to a vehicle heater.

2. The apparatus of claim 1 comprising:
   means responsive to said first and said second signal, for controlling electrical power to accessible vehicle accessory power outlets and to a vehicle air conditioner.

3. The apparatus of claim 1, further comprising:
   said means for generating a first signal being a normally closed electrical switch, switching to an open condition responsive to the deflection of a seat under the weight of an occupant;
   said means for generating a second signal being a normally open electrical switch, switching to a closed condition responsive to the latching of a seat belt;

said means for generating a first signal being electrically parallel with said means for generating a second signal.

4. The apparatus of claim 2, further comprising:

said means for generating a first signal being a normally closed electrical switch, switching to an open condition responsive to the deflection of a seat under the weight of an occupant;

said means for generating a second signal being a normally open electrical switch, switching to a closed condition responsive to the latching of a seat belt;

said means for generating a first signal being electrically parallel with said means for generating a second signal.

5. In a vehicle having seats and passive occupant restraints corresponding to the seats, having sensors generating signals responsive to occupancy of one or more seats, having sensors generating signals responsive to latching of a passive occupant restraint corresponding to an occupied seat, having controlling means responsive to the sensors for inhibiting operation of one or more vehicle systems, having one or more units of the group consisting of air heating and air conditioning the improvement comprising:

said controlling means inhibiting all power to accessible vehicle accessory power outlets and to at least one said unit.

* * * * *